(12) United States Patent
Fernandez Alonso et al.

(10) Patent No.: US 9,350,737 B2
(45) Date of Patent: May 24, 2016

(54) HANDLING OF AUTHORIZATION REQUESTS FOR A PACKET-BASED SERVICE IN A MOBILE NETWORK

(75) Inventors: Susana Fernandez Alonso, Madrid (ES); Reiner Ludwig, Hurtgenwald (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/372,321

(22) PCT Filed: Jan. 19, 2012

(86) PCT No.: PCT/EP2012/050812
§ 371 (c)(1),
(2), (4) Date: Jul. 15, 2014

(87) PCT Pub. No.: WO2013/107513
PCT Pub. Date: Jul. 25, 2013

(65) Prior Publication Data
US 2015/0222634 A1  Aug. 6, 2015

(51) Int. Cl.
*H04L 29/06* (2006.01)
*H04W 12/08* (2009.01)
*G06F 7/04* (2006.01)
(Continued)

(52) U.S. Cl.
CPC ............... *H04L 63/10* (2013.01); *H04L 63/20* (2013.01); *H04W 12/08* (2013.01)

(58) Field of Classification Search
None
See application file for complete search history.

(56) References Cited

U.S. PATENT DOCUMENTS

| 8,381,268 | B2 | 2/2013 | Winget et al. |
| 2008/0282327 | A1* | 11/2008 | Winget et al. ........... 726/4 |
| 2010/0146596 | A1 | 6/2010 | Stenfelt et al. |

(Continued)

FOREIGN PATENT DOCUMENTS

WO  2012001516 A2  1/2012

OTHER PUBLICATIONS

"3rd Generation Partnership Project; Technical Specification Group Core Network and Terminals; Policy and Charging Control over Rx reference point (Release 11)", 3GPP Standard, 3GPP TS 29.214, 3rd Generation Partnership Project (3GPP), Mobile Competence Centre; 650, Route Des Lucioles; F-06921 Sophia-Antipolis Cedex, France, vol. CT WG3 No. V11.3.0, Dec. 16, 2011, pp. 1-51, XP050554565.

(Continued)

*Primary Examiner* — Shin-Hon Chen
(74) *Attorney, Agent, or Firm* — Rothwell, Figg, Ernst & Manbeck, P.C.

(57) ABSTRACT

A policy controller (30) of a mobile network receives an authorization request (302) for a packet-based service from a node (80). In response to receiving the authorization request (302), the policy controller performs an authorization check (305) to determine an authorization status of the service and sends an authorization response (306) to the node (80). The authorization response (306) indicates the authorization status of the service. In response to the same authorization request (302), the policy controller (30) performs at least one further authorization check to redetermine the authorization status of the service. If the further authorization check indicates that the authorization status of the service has changed, the policy controller (30) sends a status change message (311) to the node. The status change message (311) indicates to the node (80) that the authorization status of the service has changed.

16 Claims, 8 Drawing Sheets

(51) Int. Cl.
*G06F 15/16* (2006.01)
*G06F 17/30* (2006.01)

(56) References Cited

U.S. PATENT DOCUMENTS

2011/0191482 A1    8/2011  Przybysz et al.
2012/0210415 A1*   8/2012  Somani et al. .................... 726/9
2012/0303831 A1*  11/2012  Toshniwal et al. ............ 709/229

OTHER PUBLICATIONS

"3rd Generation Partnership Project; Technical Specification Group Services and System Aspects; Policy and charging control architecture (Release 11)", 3GPP Standard, 3GPP TS 23.203, 3rd Generaton Partnership Project (3GPP), Mobile Competence Centre; 650, Route Des Lucioles; F-06921 Sophia-Antipolis Cedex, France, No. V11.1.0, Mar. 2011, pp. 1-136.

"3rd Generation Partnership Project; Technical Specification Group Core Network and Terminals; Policy and Charging Control over Gx reference point (Release 11)", 3GPP Standard, 3GPP TS 29.212, 3rd Generation Partnership Project (3GPP), Mobile Competence Centre; 650, Route Des Lucioles; F-06921 Sophia-Antipolis Cedex, France, No. V11.0.1, Mar. 2011, pp. 1-132.

"3rd Generation Partnership Project; Technical Specification Group Core Network and Terminals; Policy and Charging Control over Rx reference point (Release 11)", 3GPP Standard, 3GPP TS 29.214, 3rd Generation Partnership Project (3GPP), Mobile Competence Centre; 650, Route Des Lucioles; F-06921 Sophia-Antipolis Cedex, France, No. V11.0.0, Mar. 2011, pp. 1-50.

Office Action issued on Nov. 10, 2015 in corresponding Japanese application No. 2014-552527, 2 pages (English translation only).

* cited by examiner

US 9,350,737 B2

HANDLING OF AUTHORIZATION REQUESTS FOR A PACKET-BASED SERVICE IN A MOBILE NETWORK

CROSS-REFERENCE TO RELATED APPLICATION

This application is a 35 U.S.C. §371 National Phase Entry Application from PCT/EP2012/050812, filed Jan. 19, 2012, and designating the United States.

TECHNICAL FIELD

The present invention relates to methods of handling authorization requests for a packet-based service in a mobile network and to corresponding devices.

BACKGROUND

In order to manage usage of network resources, a network may implement policy control mechanisms. For example, 3GPP (Third Generation Partnership Project) mobile networks are provided with a Policy and Charging Control (PCC) architecture. Details of the PCC architecture can be found in 3GPP Technical Specification (TS) 23.203. The PCC architecture allows the operators to achieve real-time control of their network resources, control subscriber access to services, and proactively optimize network capacity. Elements of the PCC architecture include a policy controller, referred to as Policy and Charging Rules Function (PCRF), a Policy Enforcement Function (PCEF) and/or a Bearer Binding and Event Reporting Function (BBERF), and an Application Function (AF).

The PCRF provides network control regarding service data flow detection, gating, Quality of Service (QoS), and flow based charging. This control involves controlling enforcement of PCC rules by the PCEF and/or controlling enforcement of QoS rules by the BBERF, e.g., by creating PCC rules and installing them in the PCEF, by creating QoS rules and installing them in the BBERF, or by activating or deactivating installed PCC rules or QoS rules.

The AF is an element offering packet-based services or applications that require packet-based transfer of data to or from a user equipment (UE). The PCC architecture allows for subjecting this packet-based transfer of data to dynamic policy and/or charging control. For this purpose, the AF may communicate with the PCRF to transfer information related to the service. The PCRF may use this information for making control decisions.

For example, when the AF needs to transfer data of a service or application to or from the UE, the AF may communicate with the PCRF to request to authorization of the service. The PCRF may then authorize the service, create the corresponding PCC/QoS rules and install them in the PCEF or BBERF.

Alternatively, the PCRF may not authorize the service. The decision to refuse authorization of the service may be based on different criteria, e.g., as defined in a subscription profile of a user. The PCRF may indicate the reason why the service was not authorized to the AF. Based on this information, the AF may take different actions, e.g., reattempt authorization of the service after a period of time.

In some scenarios, the conditions forming the basis of rejecting authorization of the service may change. For example, if the rejection was due to the subscriber belonging to a category not allowed to use a certain service, the category of the subscriber may be changed by the operator. Further, if the rejection was due to the UE roaming in a visited network in which case usage of a certain service is not allowed by roaming agreements, the UE may move back to its home network, in which case usage of the service would be allowed again. Further, if the authorization was rejected due to a quota of the subscriber being used up, the subscriber could refill the quota.

However, the AF typically does not know when such a change of conditions occurs. Accordingly, frequent rejections may occur if the AF blindly reattempts authorization of the service. On the other hand, if the AF does not reattempt authorization of the service, otherwise allowed usage of the service could be prohibited.

Accordingly, there is a need for techniques which allow for efficiently authorizing a service in a mobile network.

SUMMARY

According to an embodiment of the invention, a method of handling an authorization request for a packet-based service in a mobile network is provided. According to the method, a policy controller receives the authorization request from a node. In response to receiving the authorization request, the policy controller performs an authorization check to determine an authorization status of the service and sends an authorization response to the node. The authorization response indicates the authorization status of the service. In response to the same authorization request, the policy controller performs at least one further authorization check to redetermine the authorization status of the service. If the further authorization check indicates that the authorization status of the service has changed, the policy controller sends a message to the node. The message indicates to the node that the authorization status of the service has changed.

According to a further embodiment of the invention, a method of handling an authorization request for a packet-based service in a mobile network is provided. According to the method, a node sends an authorization request to a policy controller of the mobile network and receives an authorization response from the policy controller. The authorization response indicating an authorization status of the service as determined by the policy controller. In addition, the node receives a message from the policy controller. The message indicates that the authorization status of the service has changed. The node controls its operation with respect to the service depending on the authorization status indicated by the authorization response and the message indicating that the authorization status of the session has changed.

According to a further embodiment of the invention, a policy controller is provided. The policy controller is configured to control resources in a mobile network. The policy controller comprises an interface for communication with a node and a processor. The processor is configured to receive, via the interface, an authorization request for a packet-based service in the mobile network. Further, the processor is configured to perform, in response to receiving the authorization request, an authorization check to determine an authorization status of the service and send, via the interface an authorization response to the node. The authorization response indicating the authorization status of the service. Additionally, the processor is configured to perform, in response to receiving the authorization request, a further authorization check to redetermine the authorization status of the service and, if the further authorization check indicates that the authorization status of the service has changed, send via the interface a message to the node. The message indicates that the authorization status of the service has changed.

According to a further embodiment of the invention, a node is provided. The node comprises an interface for communication with a policy controller of a mobile network and a processor. The processor is configured to send, via the interface, an authorization request for a packet-based service in the mobile network to the policy controller and to receive, via the interface, an authorization response from the policy controller. The authorization response indicates an authorization status of the service as determined by the policy controller. Further, the processor is configured to receive, via the interface, a message from the policy controller. The message indicates that the authorization status of the service has changed. Further, the processor is configured to control operation of the node with respect to the service depending on the authorization status indicated by the authorization response and the status change message.

DETAILED DESCRIPTION OF EMBODIMENTS

In the following, the invention will be explained in more detail by referring to exemplary embodiments and to the accompanying drawings. The illustrated embodiments relate to concepts of authorizing a packet-based service in a mobile network. Typically, the service is a functionality in the mobile network which can be accessed by a UE connected to the mobile network. The service may be implemented by a certain application on a server and/or the UE. In the illustrated examples, the concepts are applied in a mobile network according to the 3GPP TSs. However, it is to be understood that the illustrated concepts may be applied in other types of mobile network as well.

Figure 1:
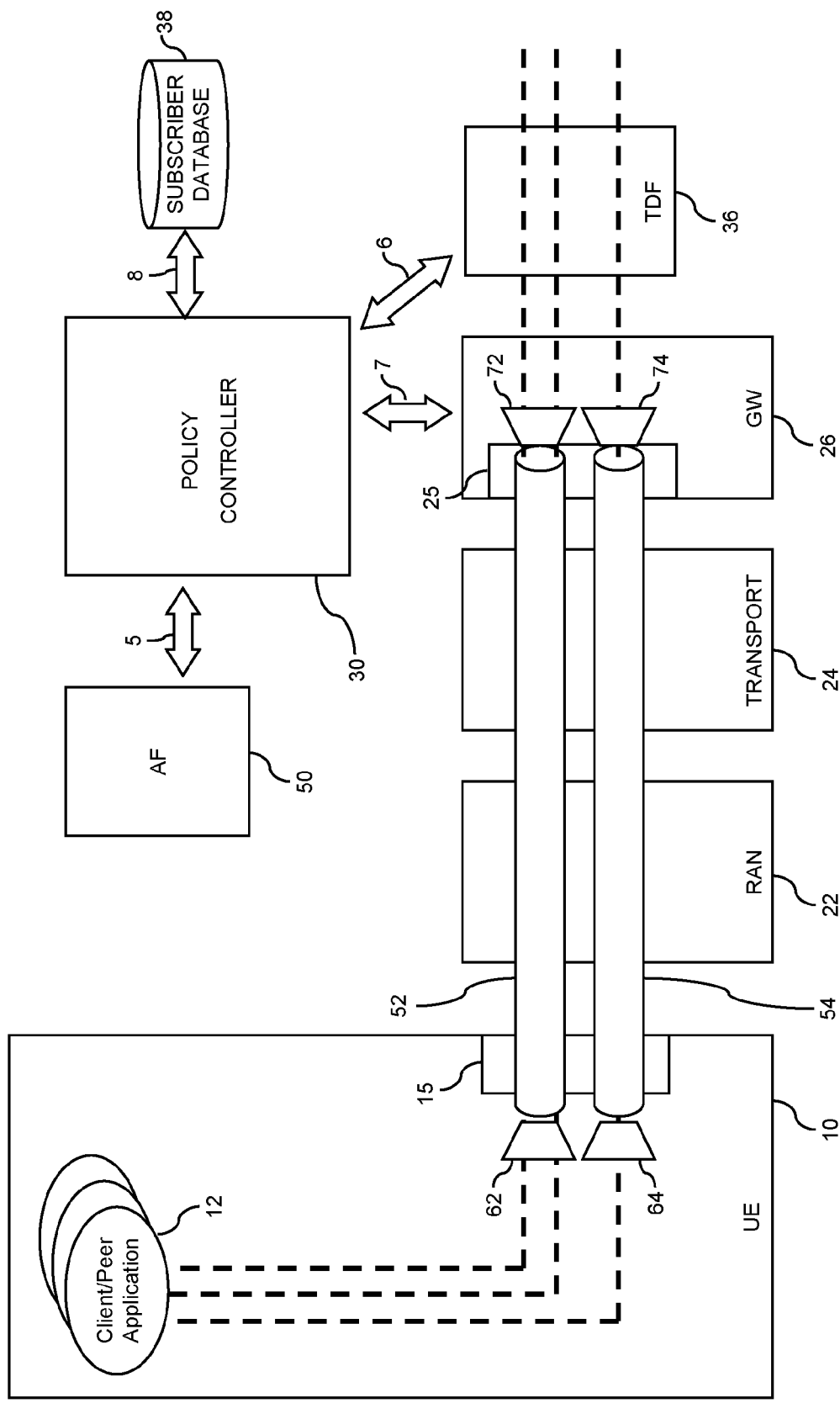
FIG. 1 schematically illustrates a mobile network environment in which concepts of session authorization according to an embodiment of the invention can be applied.

FIG. 1 schematically illustrates a mobile network environment in which concepts according to embodiments of the invention the invention can be applied.

The mobile network environment includes a UE 10, which may also be referred to as a terminal, and a number of mobile network components 22, 24, 26, 30, 36. Among these mobile network components there is a Radio Access Network (RAN) 22. The RAN 22 is based on a certain type or certain types of radio access technology (RAT), e.g., GSM (Global System for Mobile Communications), EDGE (Enhanced Data Rate for GSM Evolution), UMTS (Universal Mobile Telecommunications System), Wideband Code Division Multiple Access (WCDMA), or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a Packet Data Network Gateway (PDN GW).

In addition, the mobile network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 7, which may be implemented using the Gx interface according to the 3GPP TSs. The policy controller 30 may be further coupled to a subscriber database 38, e.g., a Subscription Profile Repository (SPR) or a User Data Repository (UDR) according to the 3GPP TSs, via a signaling path 8, e.g., implemented using the Sp interface according to the 3GPP TSs. The policy controller 30 may thus receive data relating to a specific user and/or relating to a specific service available in the mobile communication network, e.g., mobile TV.

As further illustrated, the mobile network environment includes an application function (AF) 50. The AF 50 provides one or more packet-based services or applications to be used by the UE 10, e.g., by interaction between the AF 50 and one or more client/peer applications 12 running on the UE 10. The AF 50 may communicate with the policy controller 30 using a control signaling path 5, which may be implemented using the Rx interface according to the 3GPP TSs.

In the illustrated example, the mobile network also includes a Traffic Detection Function (TDF) 36. The TDF 36 is a node configured to detect certain types of packet-based data traffic, e.g., as generated by a certain service provided by the AF 50 and to report the detected data traffic to the PCRF 30. For this purpose, the TDF 36 may communicate with the PCRF 30 using a signaling path 6. The signaling path 6 may be implemented using the Sd interface according to the 3GPP TSs. In some scenarios, the signaling path 6 may also be implemented using the Rx interface according to the 3GPP TSs. That is to say, in communication with the PCRF 30, the TDF 36 may act as an AF.

As further illustrated, data traffic between the network and the UE 10 is carried by a number of bearers 52, 54 established across a radio interface between the UE 10 and the RAN 22. The data traffic may in particular pertain to one or more of the services provided by the AF 50 and may be transferred between the UE 10 and the AF 50. The bearers 52, 54 are established between the UE 10 and the gateway 26. The bearers 52, 54 may carry data traffic in both the DL and the UL direction, i.e., may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided with a corresponding interface 25 which allows for receiving incoming data packets from the bearers 52, 54 and sending outgoing data packets on the bearers 52, 54. The bearers 52, 54 may include a default bearer 52 generally established for offering packet-based services to the UE 10 and one or more dedicated bearer 54 which may have different QoS level, e.g., a higher or lower QoS level, than the default bearer 52. The default bearer 52 is typically established when the UE 10 attaches to the gateway 26 and receives its packet-based connectivity, which may for example involve assigning an Internet Protocol (IP) address to the UE 10. The dedicated bearer 54 is typically established on demand, e.g., when data packets requiring a certain QoS level need to transmitted. For example, the dedicated bearer 54 may be established when a session between the UE 10 and the AF 50 is initiated by one of the client/peer applications 12.

Each bearer 52, 54 may be associated with a corresponding QoS profile. The QoS profile may be defined through parameters such as a QoS Class Identifier (QCI), an Allocation/Retention Priority (ARP), a Maximum Bit Rate (MBR), an Aggregate Maximum Bit Rate (AMBR), and/or a Guaranteed Bit Rate (GBR). A Traffic Handling Priority (THP) may for example be generated from the QCI. Accordingly, a certain QoS level may be provided for communicating data packets between the UE 10 and the gateway 26 by assigning the data packets to a corresponding one of the bearers 52, 54.

In the UE 10, the data packets are routed to a desired bearer 52, 54 using correspondingly configured packet classification rules in the form of UL packet filters 62, 64. In the gateway 26, the data packets are routed to the desired bearers 52, 54 using correspondingly configured packet classification rules in the form of DL packet filters 72, 74. In accordance with the illustrated 3GPP scenario, a set of filters 62, 64, 72, 74 which operates to direct the data packets to a corresponding bearer may also be referred to as a TFT. Parameters of the QoS profile may be signaled from the policy controller 30 to the gateway 26 using the signaling path 7. Similarly, the DL packet filters 72, 74 to be used in the gateway 26 may be signaled from the policy controller 30 to the gateway 26 via the signaling path 7. As regards the UL packet filters 62, 64 used in the UE 10, these may be signaled from the policy controller 30 via the gateway 26 to the UE 10.

In the scenario as illustrated in FIG. 1, a packet-based service provided by the AF 50 in cooperation with one or more of the client/peer applications 12 of the UE 10 may thus transfer data over one or more of the bearers 52, 54 which are controlled by the policy controller 30. In order to allow such control, the service may be authorized by the policy controller 30 with respect to the AF 50, e.g., on the basis of subscription data from the subscriber database 38 and/or other data or rules configured in the policy controller 30. The concepts according to embodiments of the invention as described in the following allow for efficiently implementing such authorization of a service.

In this respect, a mechanism may be used which allows the policy controller 30 to indicate to the AF 50 changes in the authorization status of a service without requiring multiple authorization requests issued from the AF 50 to the policy controller 30. Using this mechanism, the policy controller 30 may receive a single authorization request and, after sending an initial authorization response indicating the authorization status, indicate a later authorization change to the AF 50. For example, the policy controller 30 may indicate a change from an authorization status in which a service or components thereof are temporarily not authorized to an authorization status in which the service or components thereof are authorized, and vice versa. For this purpose the policy controller 30 may redetermine the authorization status of the service.

The AF 50 may subscribe to be notified about the changes of the authorization status, e.g., by providing a corresponding indication in an authorization request transmitted from the AF 50 to the policy controller 30. When the policy controller 30 informs the AF 50 that a service is temporarily not authorized, the AF 50 may stop its activities with respect to the service for which authorization was requested, e.g., by not sending the same authorization request again. When the policy controller 30 informs the AF that the service is authorized again, the AF 50 may continue its activities with respect to the service, which may also involve contacting the policy controller 30 again.

In the mechanism as described herein, two types of sessions may be distinguished: a session established between the UE 10 and the AF 50, which may also be referred to as a service session or AF session, and a session established between the AF 50 and the policy controller 30, which may also be referred to as a control session or, in accordance with the implementation of the signaling path 5, as an Rx session. The service session has the purpose of allowing the UE 10 to access to the service, e.g., by conveying data between the UE 10 and the AF 50. The control session has the purpose conveying information concerning the service and its authorization between the AF 50 and the policy controller 30. The control session may be initiated by an authorization request from the AF 50 to the policy controller 30. With the mechanism as described herein, the control session may be kept active even if the service for which authorization is requested is temporarily not authorized, and the service becoming authorized again may be efficiently indicated without requiring establishment of a new control session.

Figure 2:
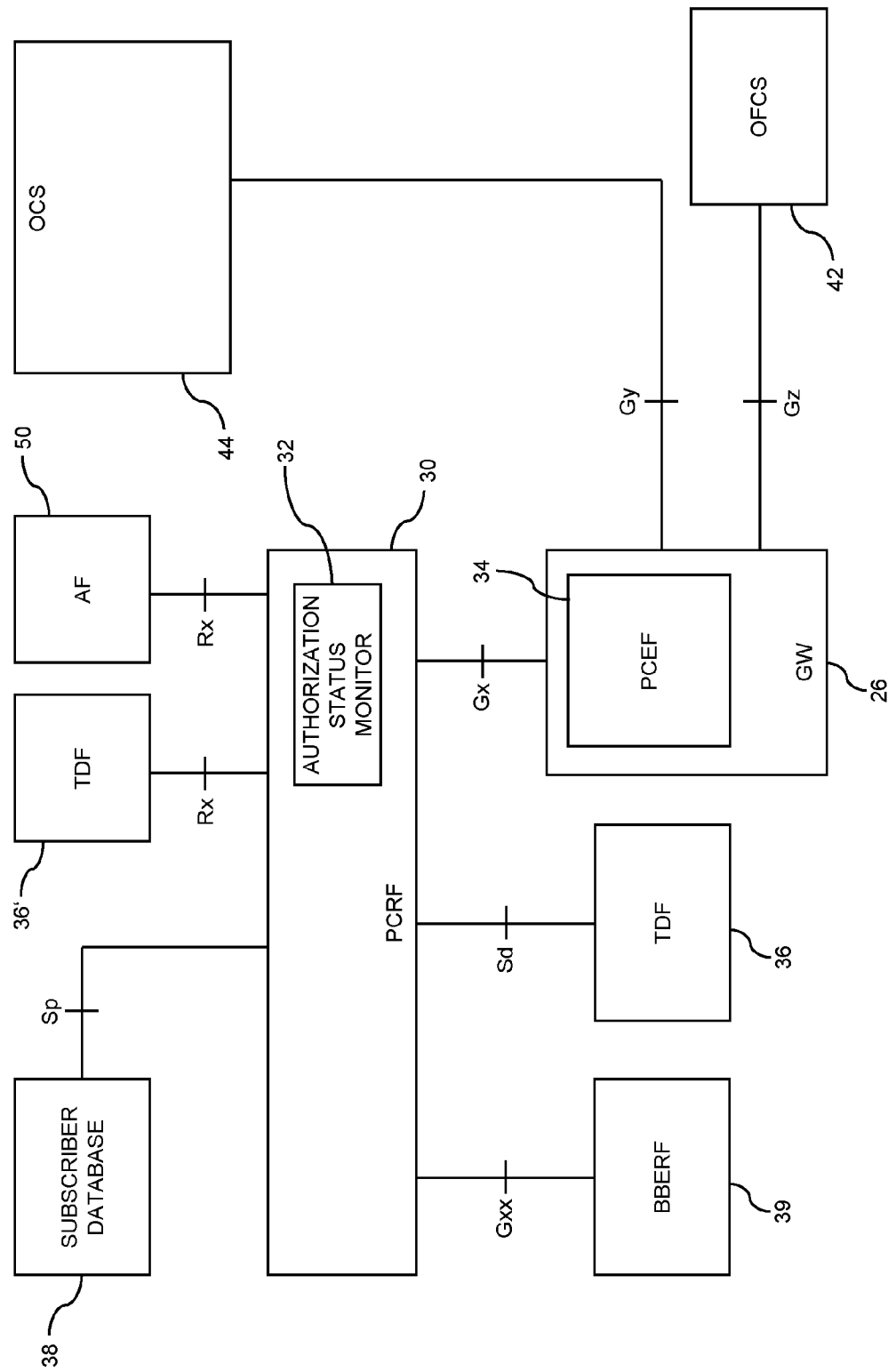
FIG. 2 schematically illustrates a PCC architecture according to an embodiment of the invention.

FIG. 2 illustrates implementation of concepts according to an embodiment of the invention in a PCC architecture according to the 3GPP TS 23.203. As illustrated, the PCC architecture includes the GW 26, the PCRF 30, the subscriber database 38. Further, the PCC architecture also includes a PCEF 34 which is implemented in the GW 26. In the illustrated example, the subscriber database 38 is assumed to correspond to an SPR. However, it is to be understood that other types of subscriber database could be used as well, e.g., a User Data Repository (UDR). As illustrated, the PCC architecture may also include one or more TDF 36, 36', a BBERF 39, an Offline Charging System (OFCS) 42, an Online Charging System (OCS) 44, and the AF 50.

The PCRF 30 may be configured to perform policy control decision and/or flow based charging control. The PCRF 30 may provide network control regarding detection of service data flows detection, gating, QoS, and flow based charging towards the PCEF 34. For this purpose, the PCRF 30 may signal PCC rules to the PCEF 34. The PCEF 34 may be configured to perform service data flow detection, policy enforcement and flow based charging functionalities, which is typically accomplished by applying the PCC rules as signaled by the PCRF 30. Further, the PCEF 34 may also implement functionalities of packet inspection, such as Deep Packet Inspection (DPI), and service classification. In this way data packets may be classified according to PCC rules defined in the PCEF 34 and be assigned to a certain service.

The PCEF 34 may be responsible for enforcing policies with respect to authentication of subscribers, authorization to access and services, accounting, and mobility. The PCRF 30 may be responsible for managing individual policies defining network, application, and subscriber conditions that must be met in order to successfully deliver a service or maintain the QoS of a given service. The subscriber database 38, which may be a standalone database or integrated into an existing subscriber database such as a Home Subscriber Server (HSS), may include information such as entitlements, rate plans, etc. The subscriber database 38 may provide subscription data such as a subscriber's allowed services, a preemption priority for each allowed service, information on a subscriber's QoS parameters, e.g., a subscribed guaranteed bandwidth QoS, a subscriber's charging related information, e.g., location information relevant for charging, a subscriber category, e.g., whether the subscriber is a gold user to be provided with a high QoS or a silver or bronze user to be provided with lower QoS.

The AF 50 is an element which may be configured to provide one or more packet-based services to a UE connected to the mobile network. These services can be delivered in a network layer which is different from a network layer in which the service was requested. For example, the service can be requested in a signaling layer, e.g., by signaling between the UE and the AF 50, and delivered in the transport layer, e.g., by transferring data packets between the GW 26 and the UE. Examples of AFs are functions of an IP Multimedia Subsystem (IMS) of the mobile network, such as a Proxy Call Session Control Function (P-CSCF), or application servers such as a Session Initiation Protocol (SIP) application server. The AF may also be used to control acceleration or prioritization of content delivery from a content provider. The AF 50 typically communicates with the PCRF 30 to transfer session information, e.g., description of data to be delivered in the transport layer. As mentioned above, this may also involve authorization of a service by the PCRF 30 upon receiving an authorization request from the AF 50.

The TDFs 36, 36' may support packet inspection and service classification, e.g., by performing Deep Packet Inspection (DPI). For this purpose, data packets may be classified according to rules configured in the TDF 36, 36' so that the data packets can be assigned to a certain type of service. The PCRF 30 can then control the provision of appropriate network resources for this service, e.g., by installing or configuring corresponding PCC rules in the PCEF 34. The TDF 36, 36' can be implemented as a standalone node or can be integrated in another network node. In the illustrated PCC architecture, the TDF 36' is assumed to further act as a probe for collecting information on traffic transferred through the mobile network, e.g., by tracking used network resources on the basis of Uniform Resource Locators (URLs) or Inform Resource Identifiers (URIs) in inspected data packets.

As further illustrated in FIG. 2, the nodes of the PCC architecture are coupled to each other by interfaces or reference points termed as Gx, Gxx, Gy, Gz, Sd, Sp, Sy, and Rx. The Gx reference point resides between the PCRF 30 and the GW 26, and allows for communication between the PCRF 30 and the PCEF 34. The Gxx reference point resides between the PCRF 30 and the BBERF 39. The Gy reference point resides between the GW 26 and the OCS 44. The Gz reference point resides between the GW 26 and the OFCS 42. The Rx reference point resides between the AF 50 and the PCRF 30. Further, the Rx reference point is also used to implement the interface between the TDF 36' and the PCRF 30. Accordingly, the TDF 36' may act as an AF when communicating with the PCRF 30. The Sd reference point resides between the TDF 36 and the PCRF 30. The Sp reference point resides between the subscriber database 38 and the PCRF 30. The Sy reference point resides between the OCS 42 and the PCRF 30. Details concerning the implementation of these interfaces and protocols can be found in the 3GPP TSs, e.g., 3GPP TSs 23.203, 29.212, 29.213, and 29.214. It is to be understood that the PCC architecture of FIG. 2 is intended to show exemplary elements which may be involved in implementation of embodiments of the invention, but that also other elements could be involved in implementation of embodiments of the invention. For example, the PCC architecture of FIG. 2 could be modified with respect to the nodes interfaced to the PCRF 30 and the respective interfaces. For example, the subscriber database 38 could be implemented as a UDR and the interface of the subscriber database 38 to the PCRF 30 could be implemented by the Ud reference point. Also, the PCC architecture could include a V-PCRF (Visited PCRF) to be used for users which are roaming, and the PCRF 30 could be provided with an interface to the V-PCRF, e.g., implemented by the S9 reference point. Moreover, it is to be understood that multiple instances of some nodes may be provided, e.g., multiple GWs and corresponding PCEFs, multiple BBERFs, additional TDFs, or multiple AFs.

Using the mechanism as described herein, the AF 50 or the TDF 36' may send an authorization request to the PCRF 30. The authorization request may be an AA-Request (AAR) command as specified in 3GPP TS 29.214. In the PCRF 30, this authorization request may not only trigger sending of an authorization response indicating an authorization status, e.g., an AA-Answer (AAA) command as defined in 3GPP TS 29.214, but also operation of an authorization status monitor 32. The authorization status monitor 32 may perform one or more further authorization checks to determine whether the authorization status has changed and indicate such a change to the node from which the authorization request was received, i.e., to the AF 50 or TDF 36'. The change of the authorization status may for example be indicated by a Re-Authorization Request (RAR) command as defined in 3GPP TS 29.214, e.g., in a corresponding Specific Action Attribute Value Pair (Specific Action AVP). In some scenarios also an empty RAR command, i.e., an RAR command without any Specific Action AVP, may be used to indicate the change of the authorization status.

The AF 50 or the TDF 36' may indicate in the authorization request that it should be informed of a change of the authorization status, e.g., by using a corresponding Specific Action AVP. That is to say, the AF 50 or TDF 36' may subscribe to be informed of changes of the authorization status. In some scenarios, e.g., if the behavior of the AF 50 or TDF 36' is known to the PCRF 30, such a subscription may also be omitted. For example, on the basis of known behavior of the TDF 36', the PCRF 30 could assume that the TDF 36' always needs to be informed of changes of the authorization status.

Figure 3:
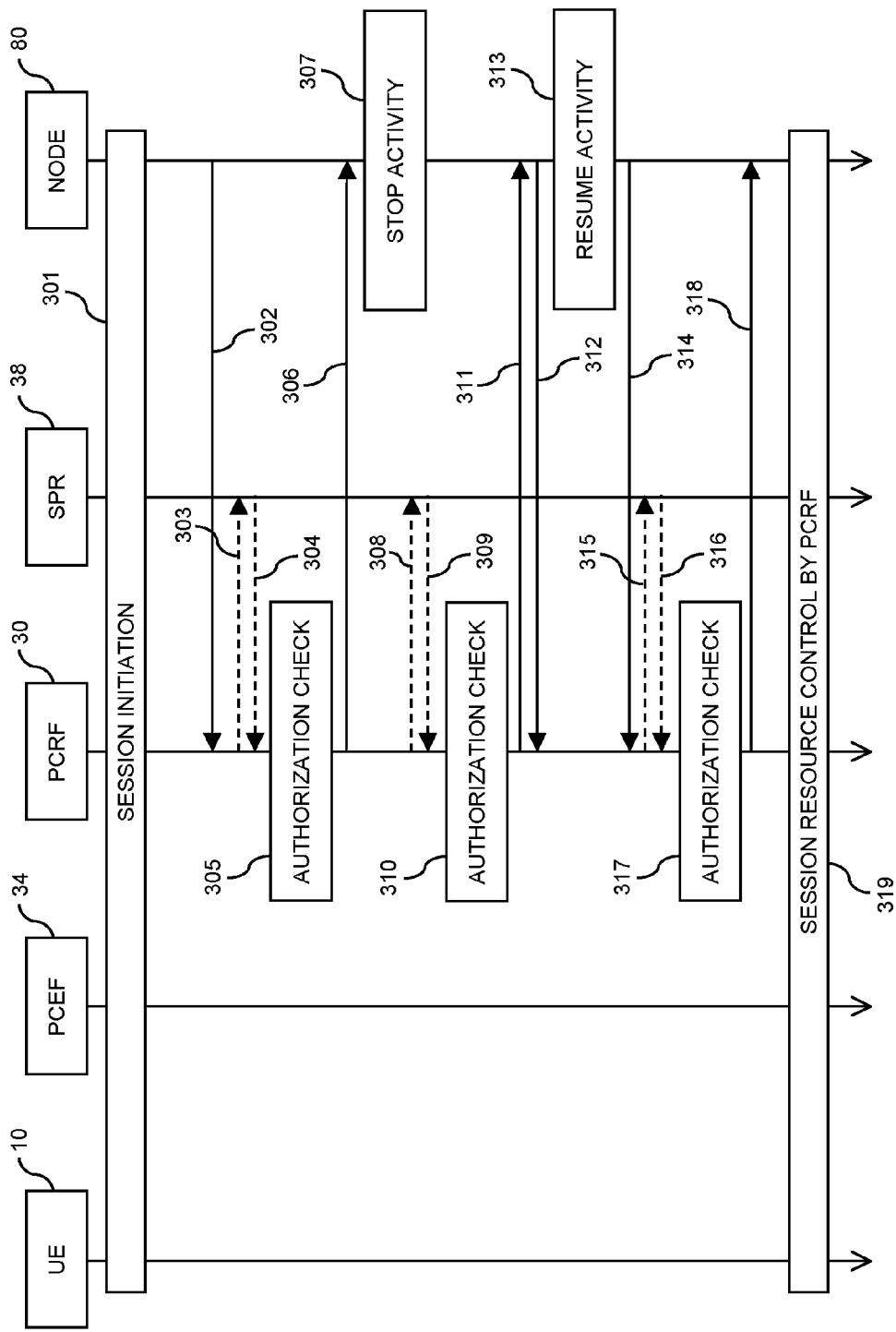
FIG. 3 shows a signaling diagram for schematically illustrating an exemplary session authorization process according to an embodiment of the invention.

FIG. 3 shows a signaling diagram for illustrating an exemplary scenario of using the mechanism for handling an authorization request for a service. In the scenario of FIG. 3, the service is initially not authorized and becomes authorized at a later point of time. The scenario of FIG. 3 involves the UE 10, the PCEF 34, the PCRF 30, the SPR 38 or other type of subscriber database, and a node 80 which may be the AF 50 or the TDF 36'.

At step 301, a service session is initiated, e.g., by the UE 10. Initiation of the session may involve signaling between the UE 10 and the node 80. Resources for transferring data of the service session are controlled by the PCRF 30 through the PCEF 34. For this purpose, the node 80 sends an authorization request 302 to the PCRF 30. The authorization request 302 initiates a control session between the node 80 and the PCRF 30. As mentioned above, the authorization request may be an AAR command. The authorization request 302 may include a description of the service to be authorized. Further, the authorization request 302 may include an indication that the node 80 is to be informed not only about the present authorization status of the service or components thereof, but also about future changes of the authorization status, e.g., in a corresponding Specific Action AVP.

As indicated by messages 303, 304, the PCRF 30 may then interact with the SPR 38 in order to receive subscription data.

At step 305, the PCRF 30 performs an authorization check to determine the authorization status of the service. The authorization check may be performed on the basis of the subscription data as received from the SPR 38. Alternatively or in addition, the authorization check may consider other data available or accessible to the PCRF 30, e.g., type of IP Connectivity Access Network (IP-CAN), type of radio access technology (RAT) used by the UE 10, available quota, time-related policies such as time-of-day policies or day-of-week policies, or the like. In the scenario of FIG. 3, the result of this authorization check is assumed to be that the service is temporarily not authorized. For example, the service could be not allowed due to the UE 10 roaming in another operator's network, due to the time-of-day not allowing usage of the service, or due to a quota available for this service being used up.

By sending authorization response 306 to the node 80, the PCRF 30 indicates the authorization status determined at step 305 to the node 80. In the scenario of FIG. 3, this means that the authorization response 306 indicates that the service is temporarily not authorized. The authorization response 306 may be an AAA command. Due to the lack of authorization being temporary, the control session between the node 80 and the PCRF 30 is kept active, i.e., neither the node 80 nor the PCRF 30 terminates the control session due to the result of the authorization check at step 305. If not all components of the service are found to be unauthorized in the authorization check of step 305, the authorization response may also indicate one or more components which are not authorized. These components may for example be indicated in terms of data flows. Examples of such components are a video component and an audio component of a multimedia service, e.g., a videoconference service. In the latter example, the result of the authorization check at step 305 could be that the video component is not authorized, but the audio component is authorized.

The node 80 receives the authorization response 306 and controls its activity correspondingly. In particular, since the authorization response 306 indicates that the service or a component thereof is temporarily not authorized, the node 80 may stop its activity with respect to the service session or with respect to any unauthorized component of the service session, as indicated by step 307. For example, the node 80 may refrain from sending a further authorization request for the service session to the PCRF 30. The node 80 may also stop a timer for monitoring user activity with respect to the service. Further, if the node 80 corresponds to the TDF 36', the node 80 may stop monitoring data traffic of the service session. However, the node 80 does not terminate the service session between the node 80 and the PCRF 30, but rather waits for an authorization status change. If not all components of the service are unauthorized, the node 80 may continue its activities with respect to the authorized components, e.g., by interacting with the PCRF 30. The PCRF 30 may then control resources for conveying data packets of the authorized components, e.g., by installing corresponding PCC rules in the PCEF 34.

As indicated by messages 308, 309, the PCRF 30 may further interact with the SPR 38 in order to receive subscription data and perform a further authorization check at step 310 to determine whether the authorization status of the service has changed. The further authorization check may be based on similar data as the authorization check of step 305, but consider changes of conditions which may have occurred since the authorization check of step 305, e.g., a change of the roaming scenario or refilling of quota. In the scenario of FIG. 3, the result of the further authorization check at step 310 is assumed to be that the service or a previously unauthorized component thereof is now authorized.

By sending a status change message 311 to the node 80, the PCRF 30 indicates the change of the authorization status determined at step 310 to the node 80. The status change message 311 may be a RAR command, and the change of the authorization status may be indicated in a corresponding Specific Action AVP. In some scenarios, the status change message 311 may also be an empty RAR command. The node 80 may respond to the status change message 311 by sending an acknowledgement message 312, e.g., in the form of a Re-Authorization-Answer (RAA) command according to 3GPP TS 29.214. If the change of the authorization status does not apply to all components of the service, the status change message 311 may also indicate the components to which the status change pertains, e.g., in terms of data flows.

The node 80 controls its activity on the basis of the change of the authorization status indicated by the status change message received from the PCRF 30. In particular, the node 80 may resume its activity with respect to the service session or with respect to the no longer unauthorized components of the service session, as indicated by step 313. For example, the node 80 may start a user inactivity timer. If the node 80 corresponds to the TDF 36' it may continue with monitoring data traffic of the service. Further, the node 80 may again send an authorization request 314 for the service to the PCRF 30.

In response to receiving the authorization request 314, the PCRF 30 may again interact with the SPR 38 in order to receive subscription data and perform a still further authorization check at step 317 to determine the authorization status of the service. The authorization check of step 317 may be based on similar data as the authorization checks of steps 305 and 310. In the scenario of FIG. 3, the result of the authorization check at step 317 is assumed to be that the service authorized, confirming the authorization check of step 310. The PCRF 30 then indicates the result of the authorization check to the node 80 by sending an authorization response 318 to the node 80. In the scenario of FIG. 3, this means that the authorization response 318 indicates that the service is authorized. The authorization response 318 may be an AAA command.

As indicated by step 319, the service session may then proceed with the PCRF 30 controlling resources for conveying data packets of the service session, e.g., by installing appropriate PCC rules in the PCEF 34.

Figure 4:
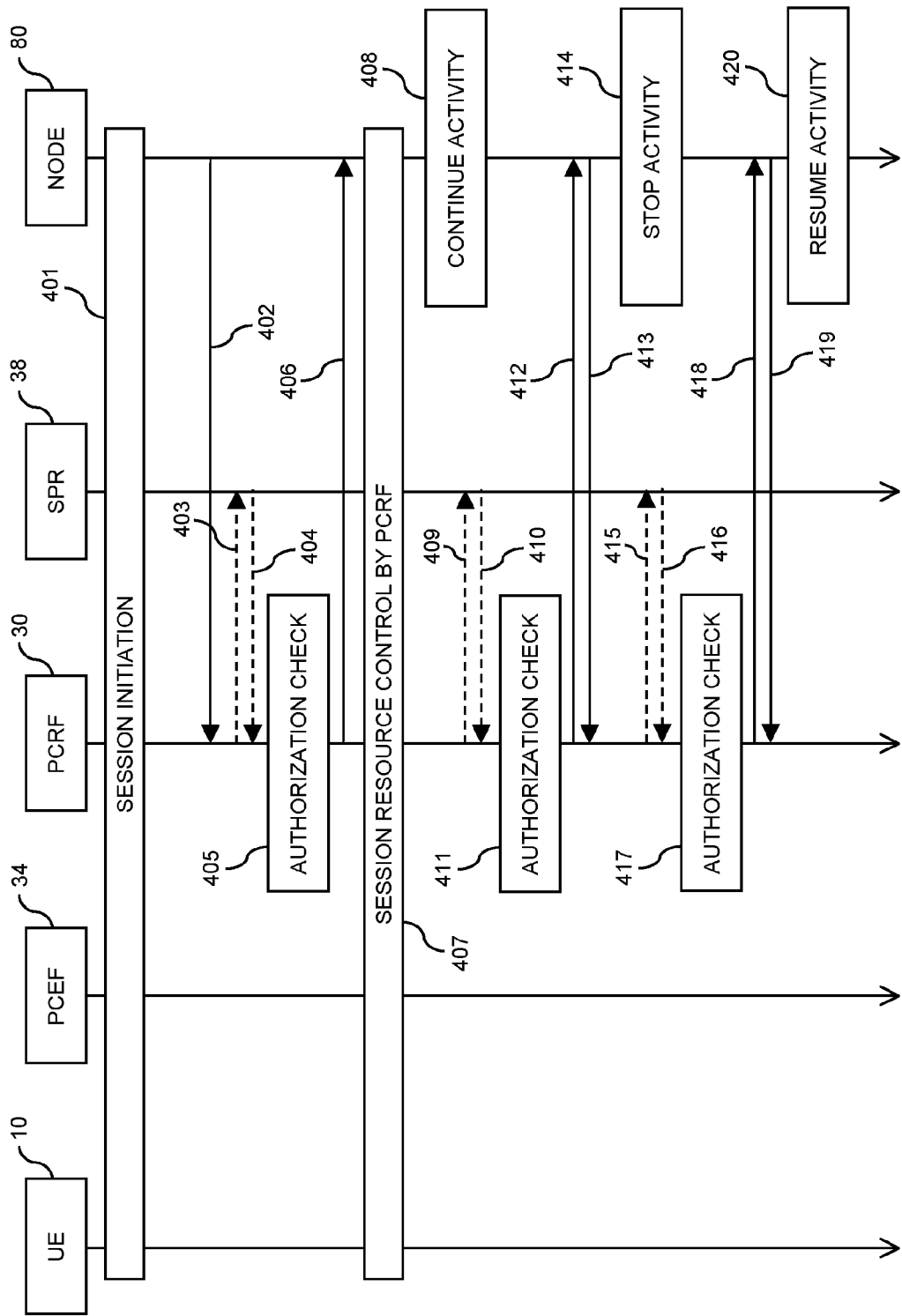
FIG. 4 shows a signaling diagram for schematically illustrating a further exemplary session authorization process according to an embodiment of the invention.

FIG. 4 shows a signaling diagram for illustrating a further exemplary scenario of using the mechanism for handling an authorization request for a service. In the scenario of FIG. 4, the service is initially authorized but temporarily looses authorization at a later point of time. The scenario of FIG. 4 involves the UE 10, the PCEF 34, the PCRF 30, the SPR 38, and a node 80 which may be the AF 50 or the TDF 36'.

At step 401, a service session is initiated, e.g., by the UE 10. Initiation of the session may involve signaling between the UE 10 and the node 80. Resources for transferring data of the service session are controlled by the PCRF 30 through the PCEF 34. For this purpose, the node 80 sends an authorization request 402 to the PCRF 30. The authorization request 402 initiates a control session between the node 80 and the PCRF 30. As mentioned above, the authorization request may be an AAR command. The authorization request 402 may include a description of the service to be authorized. Further, the authorization request 402 may include an indication that the node 80 is to be informed not only about the present authorization status of the service or components thereof, but also about future changes of the authorization status, e.g., in a corresponding Specific Action AVP.

As indicated by messages 403, 404, the PCRF 30 may then interact with the SPR 38 in order to receive subscription data.

At step 405, the PCRF 30 performs an authorization check to determine the authorization status of the service. The authorization check may be performed on the basis of the subscription data as received from the SPR 38. Alternatively or in addition, the authorization check may consider other data available or accessible to the PCRF 30, e.g., type of IP Connectivity Access Network (IP-CAN), type of radio access technology (RAT) used by the UE 10, available quota, time-related policies such as time-of-day policies or day-of-week policies, or the like. In the scenario of FIG. 4, the result of this authorization check is assumed to be that the service is authorized.

By sending authorization response 406 to the node 80, the PCRF 30 indicates the authorization status determined at step 405 to the node 80. In the scenario of FIG. 4, this means that the authorization response 406 indicates that the service is authorized. The authorization response 406 may be an AAA command.

As indicated by step 407, the PCRF 30 may then control resources for conveying data flows of the service session, e.g., by installing corresponding PCC rules in the PCEF 34. The node 80 controls its operation on the basis of the authorization status indicated by the authorization response 406. In particular, since the authorization response 406 indicates that the service is authorized, the node 80 may continue its activity with respect to the service session, as indicated by step 408. For example, the node 80 may start a timer for monitoring user activity. If the node 80 corresponds to the TDF 36' it may continue with monitoring data traffic of the service. Further, the node 80 may again interact with the PCRF 30, e.g., by sending an authorization request for updating service information to the PCRF 30.

As indicated by messages 409, 410, the PCRF 30 may further interact with the SPR 38 in order to receive subscription data and perform a further authorization check at step 411 to determine whether the authorization status of the service has changed. The further authorization check may be based on similar data as the authorization check of step 405, but consider changes of conditions which may have occurred since the authorization check of step 405, e.g., a change of the roaming scenario or changed availability of quota. In the scenario of FIG. 4, the result of the further authorization check at step 411 is assumed to be that the service or a component thereof is temporarily not authorized. For example, the service could be not allowed due to the UE 10 roaming in another operator's network, due to the time-of-day not allowing usage of the service, or due to a quota available for this service being used up.

By sending a status change message 412 to the node 80, the PCRF 30 indicates the change of the authorization status determined at step 411 to the node 80. The status change message 411 may be an RAR command, and the change of the authorization status may be indicated in a corresponding Specific Action AVP. In some scenarios, the status change message 411 may also be an empty RAR command. The node 80 may respond to the status change message 411 by sending an acknowledgement message 412, e.g., in the form of an RAA command. If the change of the authorization status does not apply to all components of the service, the status change message 411 may also indicate the components to which the status change pertains, e.g., in terms of data flows. Examples of such components are a video component and an audio component of a multimedia service, e.g., a videoconference service. In the latter example, the result of the authorization check at step 411 could be that the video component is not authorized, but the audio component is authorized.

The node 80 controls its activity in accordance with the change of the authorization status indicated by the received status change message 411. In particular, since the status change message 411 indicates that the service or a component thereof is temporarily not authorized, the node 80 may stop its activity with respect to the service session or with respect to the unauthorized component of the service session, as indicated by step 413. For example, the node 80 may refrain from sending a further authorization request for the service session to the PCRF 30. The node 80 may also stop a timer for monitoring user activity with respect to the service. Further, if the node 80 corresponds to the TDF 36', the node 80 may stop monitoring data traffic of the service session. However, the node 80 does not terminate the control session between the node 80 and the PCRF 30, but rather waits for a further change of the authorization status. If not all components of the service are unauthorized, the node 80 may continue its activities with respect to the authorized components, e.g., by interacting with the PCRF 30. The PCRF 30 may then control resources for conveying data flows of the authorized components, e.g., by installing corresponding PCC rules in the PCEF 34.

As indicated by messages 415, 416, the PCRF 30 may further interact with the SPR 38 in order to receive subscription data and perform a still further authorization check at step 417 to determine whether the authorization status of the service has changed again. The further authorization check may be based on similar data as the authorization check of steps 405 and 411 but consider changes of conditions which may have occurred since the authorization check of step 411. In the scenario of FIG. 4, the result of the authorization check at step 417 is assumed to be that the service or an unauthorized component thereof is authorized again. By sending a status change message 418 to the node 80, the PCRF 30 indicates the change of the authorization status determined at step 417 to the node 80. The status change message 418 may be an RAR command, and the change of the authorization status may be indicated in a corresponding Specific Action AVP. In some scenarios, the status change message 418 may also be an empty RAR command. The node 80 may respond to the status change message 418 by sending an acknowledgement message 419, e.g., in the form of an RAA command. If the change of the authorization status does not apply to all components of the service, the status change message 418 may also indicate the components to which the status change pertains, e.g., in terms of data flows.

The node 80 controls its operation on the basis of the change of the authorization status as indicated by the status change message 418. In particular, the node 80 may resume its activity with respect to the service session, as indicated by step 420. For example, the node 80 may restart a timer for monitoring user activity. If the node 80 corresponds to the TDF 36' it may continue with monitoring data traffic of the service. Further, the node 80 may again interact with the PCRF 30, e.g., by sending an authorization request for updating service information to the PCRF 30.

As can be seen from the example of FIG. 4, irrespective of the service temporarily loosing authorization, the control session between the node 80 and the PCRF 30 is kept active, i.e., neither the node 80 nor the PCRF 30 terminates the control session in response to the authorization check performed by the PCRF 30 at step 411 indicating a loss of authorization.

In some situations, the procedures as explained in connection with FIGS. 3 and 4 may be simplified. In particular, if the PCRF 30 is aware of the behavior of the node 80, no indication that the node 80 should be informed of future changes of the authorization status needs to be provided in the authorization request 302, 402. Rather, the PCRF 30 may assume, on the basis of its knowledge of the behavior of the node 80, that the node 80 should be informed of future changes of the authorization status. In such situations, also the status change message may be simplified, e.g., by using an empty RAR command, which is interpreted by the node 80 as an indication of a change of the authorization status. The simplified procedure may for example be used if the node 80 corresponds to the TDF 36'.

Figure 5:
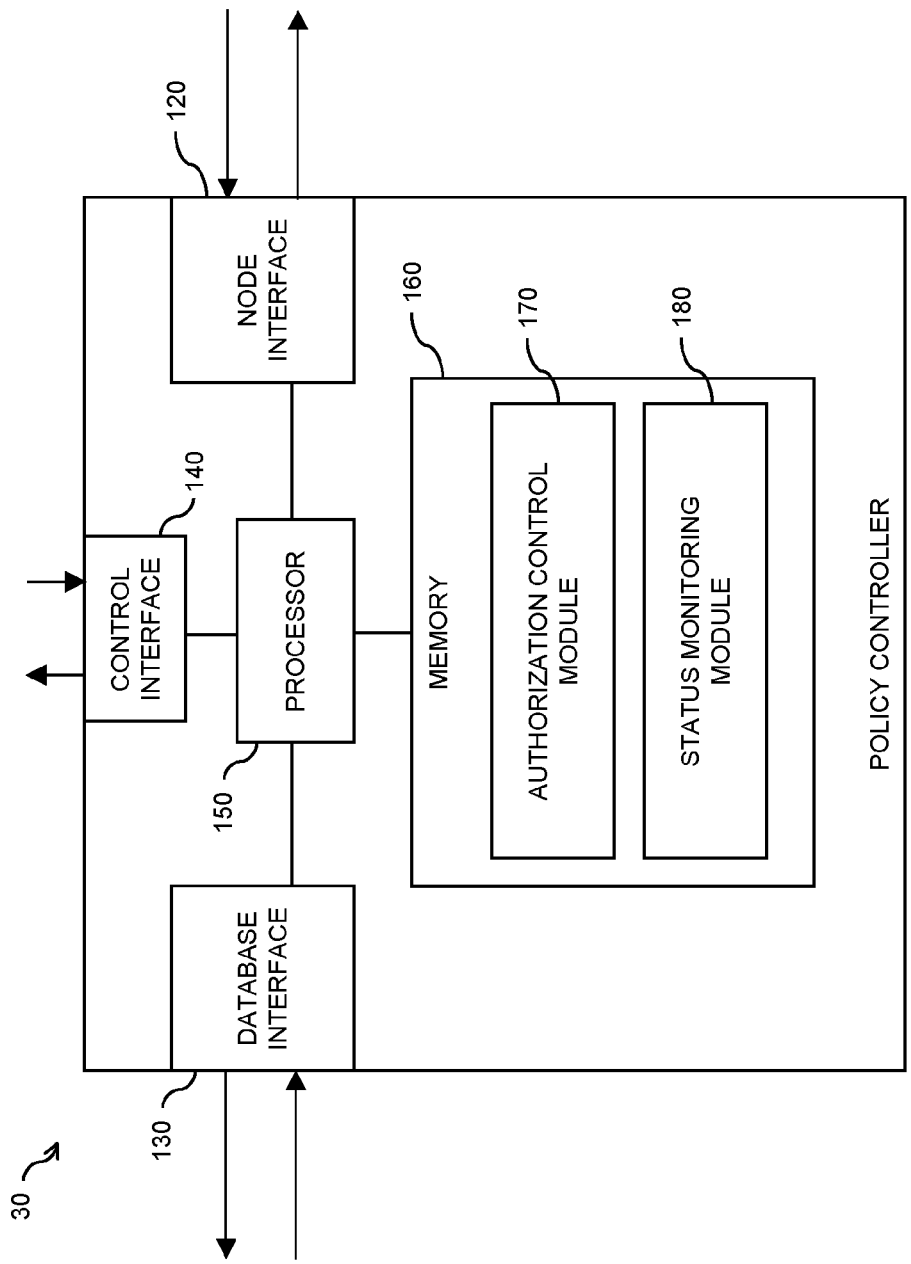
FIG. 5 schematically illustrates a policy controller according to an embodiment of the invention.

In the processes of FIGS. 4 and 5, it is to be understood that the interaction between the PCRF 30 and the SPR 38 may occur in various way. For example, as illustrated in the signaling diagrams, the PCRF 30 may send a request to the SPR 38 and receive the subscription data in response to the request. Alternatively, the SPR 38 may provide the subscription data to the PCRF 30 without such explicit request, e.g., in response to a change of the subscription data. Moreover, the authorization checks may each be triggered by various types of events, such as the PCEF 34 detecting a certain event, e.g., change of visited network or change of location.

FIG. 5 schematically illustrates a policy controller 30 which may be used for implementing the above concepts of authorizing a service. In particular, the policy controller 30 may be implemented as a PCRF according to the 3GPP TSs. In this case, authorization of the service may involve interaction between the policy controller 30 and a node via the Rx interface.

In the illustrated example, the policy controller 30 includes a node interface 120 for communication with one or more nodes, e.g., the AF 50 or the TDF 36'. In addition, the policy controller 30 may include a control interface 140, e.g., for controlling resources for conveying data. In a 3GPP PCC architecture as illustrated in FIG. 2, the node interface 120 may correspond to the Rx interface, and the control interface 140 may correspond to the Gx interface and/or to the Gxx interface. The node interface 120 may for example be used for authorizing service sessions. The control interface 140 may then be used for controlling resources for conveying data of an authorized service session or of authorized components thereof. As further illustrated, the policy controller 30 may also include a database interface 130 for interacting with a subscriber database, e.g., the subscriber database 38 of FIGS. 1 and 2.

Further, the node includes a processor 150 coupled to the interfaces 120, 130, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 160 includes suitably configured program code to be executed by the processor 150 so as to implement the functionalities of the policy controller 30 as described in connection with FIGS. 1 to 4. More specifically, the memory 160 may include an authorization control module 170 so as to implement the above-described functionalities of performing authorization checks and handling received authorization requests. Further, the memory 160 may also include a status monitoring module so as to implement the above-described functionalities of monitoring the authorization status by performing one or more further authorization checks and reporting a change of the authorization status.

It is to be understood that the structure as illustrated in FIG. 5 is merely schematic and that the policy controller 30 may actually include further components which, for the sake of clarity, have not been illustrated. Also, it is to be understood that the memory 160 may include further types of program code modules, which have not been illustrated, e.g., program code modules for implementing known functionalities of a policy controller, e.g., policy decision functionalities or the like. According to some embodiments, also a computer program product may be provided for implementing functionalities of the node, e.g., in the form of a medium storing the program code to be stored in the memory 160.

Figure 6:
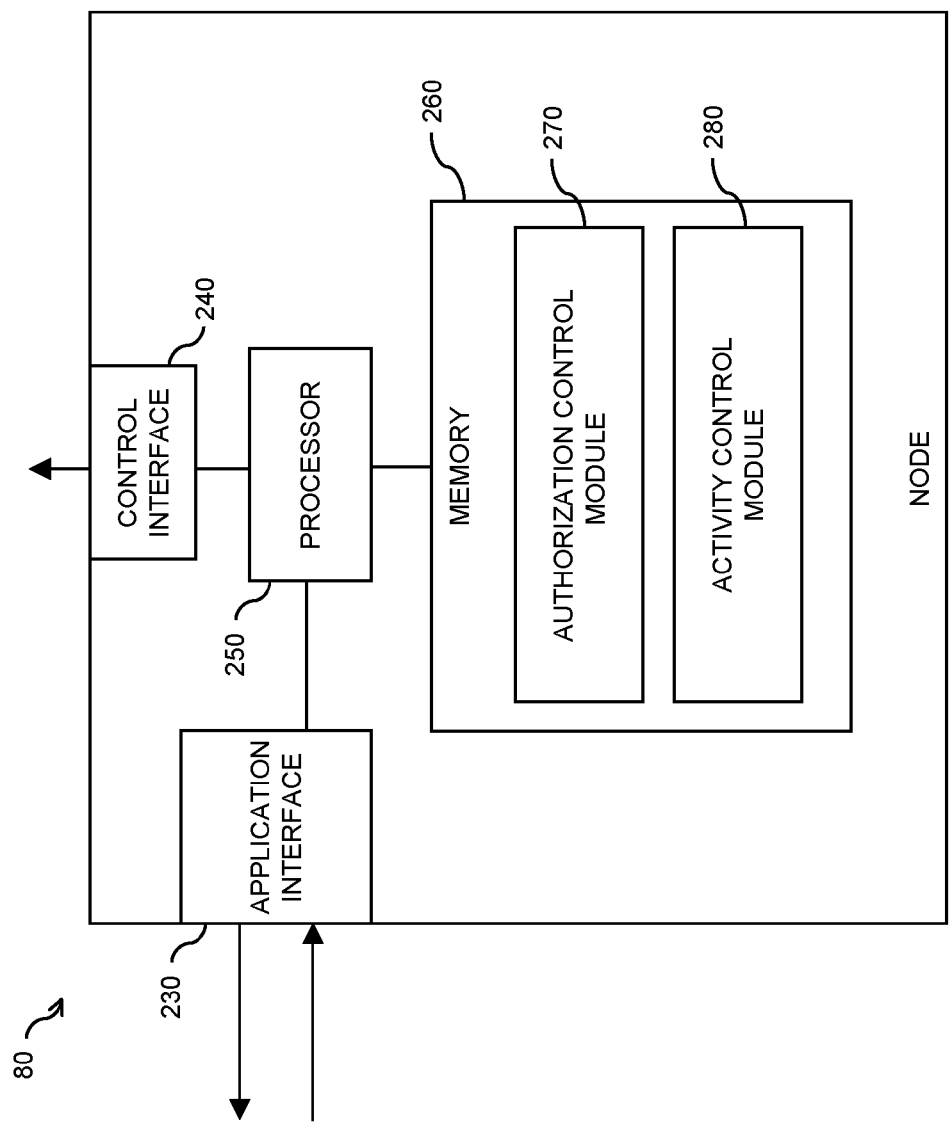
FIG. 6 schematically illustrates a node according to an embodiment of the invention.

FIG. 6 schematically illustrates a node 80 which may be used for implementing the above concepts of authorizing a service. In particular, the node 80 may be configured to interact with a PCRF according to the 3GPP TSs, e.g., using the above-mentioned Rx interface. The node 80 may for example correspond to an AF or to another node using the Rx interface to interact with the PCRF, e.g., to the TDF 36'.

In the illustrated example, the node 80 includes a control interface 240 for communication with one a policy controller of a communication network, e.g., the policy controller 30. In addition, the node 80 may include an application interface 230, e.g., for transmitting data with respect to a UE, e.g., the UE 10. In a 3GPP PCC architecture as illustrated in FIG. 2, the control interface 240 may correspond to the Rx interface. The application interface 230 may be generally IP based and may further support various types of service specific or application specific protocols, e.g., the Session Initiation Protocol (SIP). The control interface 240 may for example be used for authorizing a service in the communication network.

Further, the node 80 includes a processor 250 coupled to the interfaces 240, 230 and a memory 260 coupled to the processor 250. The memory 260 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities of a node interacting with a policy controller by sending an authorization request for a service, e.g., functionalities of the node 80 of FIGS. 3 and 4, which may be the AF 50 or the TDF 36'. More specifically, the memory 260 may include an authorization control module 270 for handling the generation and sending of authorization requests for a service and handling responses thereto, e.g., authorization responses and subsequent status change messages as described above. Further, the memory 260 may also an activity control module 280 for controlling operations of the node 80 on the basis of a received authorization response and subsequent status change message.

It is to be understood that the structure as illustrated in FIG. 6 is merely schematic and that the node 80 may actually include further components which, for the sake of clarity, have not been illustrated. Also, it is to be understood that the memory 260 may include further types of program code modules, which have not been illustrated, e.g., program code modules for implementing functionalities of certain applications or services. According to some embodiments, also a computer program product may be provided for implementing functionalities of the node, e.g., in the form of a medium storing the program code to be stored in the memory 260.

Figure 7:
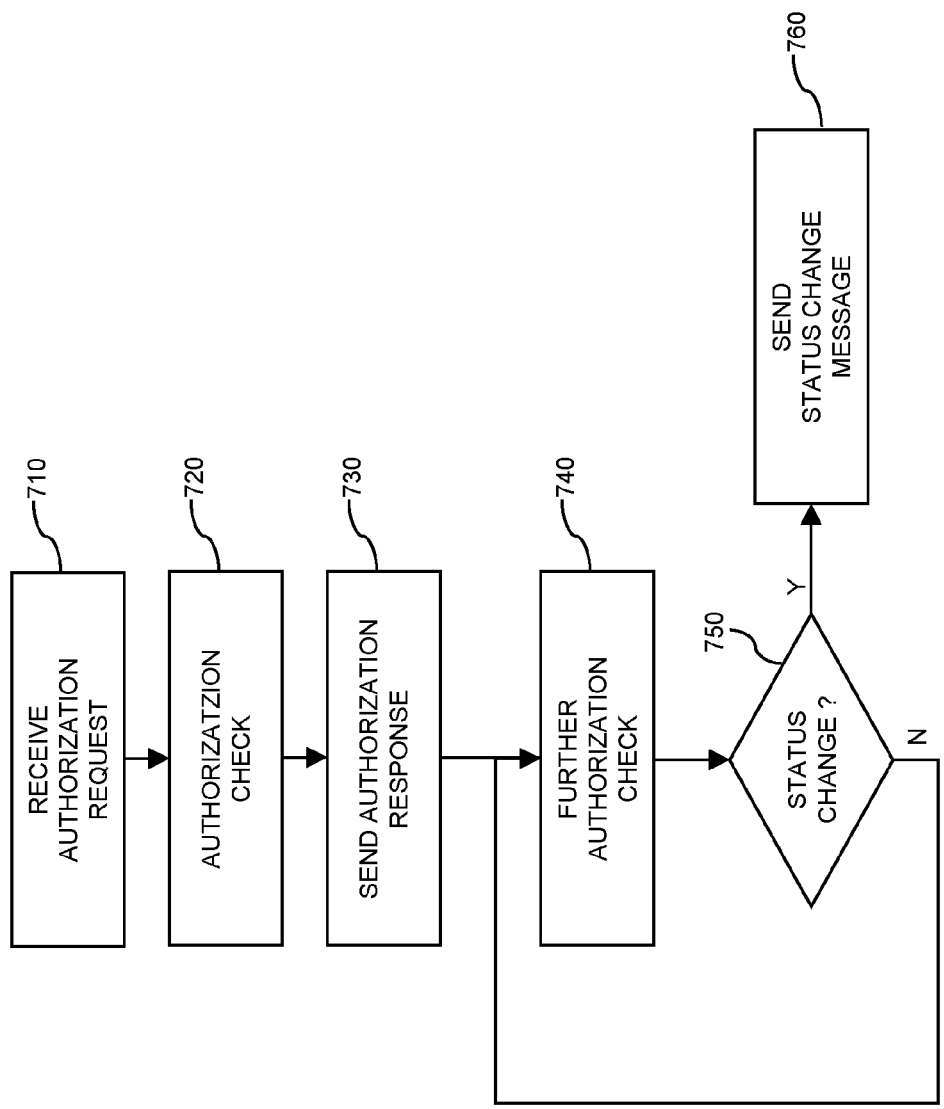
FIG. 7 shows a flowchart for illustrating a method according to an embodiment of the invention.

FIG. 7 shows a flowchart for illustrating a method for handling an authorization request for a service. The method may be used for implementing the above described concepts in a policy controller of a mobile network. In particular, the method may be implemented by the above-described policy controller 30.

At step 710, the policy controller receives an authorization request from a node. The node may for example be an AF or may act as an AF in communication with the policy controller. In a PCC architecture as illustrated in FIG. 2, this means that the authorization request is received via the Rx interface. Examples of the authorization request are the authorization request 302 of FIG. 3 and the authorization request 402 of FIG. 4. The authorization request may include an indication that the node is to be informed not only of the present authorization status of the service, but also of future changes of the authorization status as they occur. The indication may for example be a corresponding AVP in the authorization request. In some scenarios the policy controller may be aware of the behavior of the node and, on the basis of this knowledge, assume that the node is to be informed of future changes of the authorization status.

At step 720, the policy controller performs an authorization check to determine the authorization status of the service. For this purpose, the policy controller may also receive subscription data from a subscriber database so that the authorization check can be performed on the basis of the subscription data. The authorization check may additionally or alternatively be performed on the basis of other information available at the policy controller or accessible to the policy controller.

At step 730, the policy controller sends an authorization response to the node. The authorization response indicates the authorization status of the session as determined at step 720. Examples of the authorization response are the authorization response 306 of FIG. 3 and the authorization response 406 of FIG. 4. In some scenarios, such as in the scenario of FIG. 3, the authorization response may indicate that the service is temporarily not authorized. The authorization response may also indicate a component of the service which are not authorized, e.g., in terms of a packet flow. In some scenarios, such as in the scenario of FIG. 4, the authorization response may indicate that the service is authorized.

At step 740, the policy controller performs a further authorization check to redetermine the authorization status of the service. Similar to the authorization check of step 720, the further authorization check is performed in response to the authorization request of step 710 and may be based on subscription data received from a subscriber database. The further authorization check may additionally or alternatively be performed on the basis of other information available at the policy controller or accessible to the policy controller. Step 750 corresponds to a determination whether the further authorization check of step 740 indicates that the authorization status of the service has changed. If there is no change of the authorization status, as indicated by branch "N", the method may return to step 740 to repeat the further authorization check.

If the determination of step 750 indicates that the authorization status has changed, as indicated by branch "Y", the method proceeds with step 760. At step 760, the policy controller sends a message to the node. The message indicates that the authorization status of the service has changed and may therefore also be referred to as a status change message. Examples of the message are the status change message 311 of FIG. 3 and the status change message 412 of FIG. 4.

Figure 8:
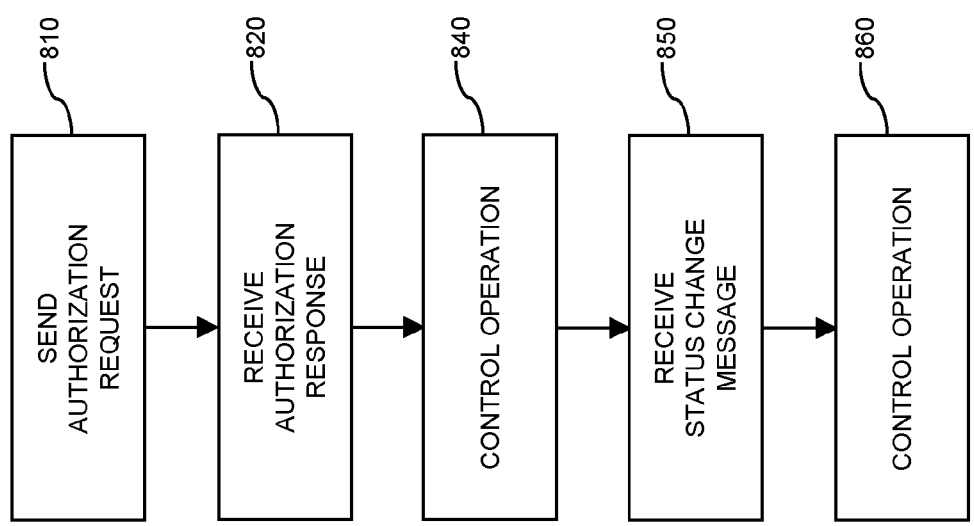
FIG. 8 shows a flowchart for illustrating a further method according to an embodiment of the invention.

FIG. 8 shows a flowchart for illustrating a further method for handling an authorization request for a service. The method may be used for implementing the above described concepts in a node interacting with a policy controller of a communication network. In particular, the method may be implemented by an AF, e.g., the AF 50, or node acting as an AF with respect to the policy controller such as the TDF 36'.

At step 810, the node sends an authorization request to the policy controller. In a PCC architecture as illustrated in FIG. 2, the authorization request may be sent via the Rx interface. Examples of the authorization request are the authorization request 302 of FIG. 3 and the authorization request 402 of FIG. 4. The authorization request may include an indication that the node is to be informed not only of the present authorization status of the service, but also of future changes of the authorization status as they occur. The indication may for example be a corresponding AVP in the authorization request.

At step 820, the node receives an authorization response from the policy controller. The authorization response indicates the authorization status of the service as determined in an authorization check performed by the policy controller. Examples of the authorization response are the authorization response 306 of FIG. 3 and the authorization response 406 of FIG. 4. In some scenarios, such as in the scenario of FIG. 3, the authorization response may indicate that the service is temporarily not authorized. The authorization response may also indicate a component of the service which are not authorized, e.g., in terms of a packet flow. In some scenarios, such as in the scenario of FIG. 4, the authorization response may indicate that the service is authorized.

At step 830, the node controls its operation with respect to the service depending on the authorization status indicated by the authorization response. For example, if the authorization response indicates that the service is temporarily not authorized, the node may refrain from resending the authorization request or sending further authorization requests for the same service. Further, the node may stop at least one activity or all its activities with respect to the service or components of the service which are not authorized, e.g., by stopping a timer for monitoring user activity in relation to the service or by stopping monitoring data traffic of the service. If the authorization response indicates that the service is authorized, the node may continue its activities with respect to the service in a usual manner, e.g., by starting a timer for monitoring activity of the user or by starting monitoring of data traffic of the service.

At step 840, the node receives a message from the policy controller. The message indicates that the authorization status of the service has changed and may therefore also be referred to as a status change message. Examples of the message are the status change message 311 of FIG. 3 and the status change message 412 of FIG. 4. The message is based on a further authorization check performed by the policy controller.

At step 840, the node further controls its operation with respect to the service depending on the authorization status indicated by the message received at step 840 and the authorization response received at step 820. For example, if the authorization response received at step 820 indicated that the service is temporarily not authorized, the node may resend the authorization request of step 810 or send further authorization requests for the service. Further, the node may resume activities with respect to the service or components of the service which are no longer unauthorized, e.g., by starting a timer for monitoring user activity or by starting monitoring data traffic of the service. If the authorization response received at step 820 indicated that the service is authorized, the node may stop at least one activity or all its activities with respect to the service in response to receiving the message of step 830, e.g., by stopping interaction for this service with respect to the policy controller, by stopping monitoring of data traffic of this service, or by stopping a timer form monitoring user activity in relation to this service. The activities may be stopped until receiving a further status change message from the policy controller, such as the status change message 418 of FIG. 4.

The methods of FIGS. 7 and 8 may be combined with each other as appropriate. For example, in a system comprising a policy controller and a node interacting with the policy controller, the method of FIG. 7 could be implemented by the policy controller, which receives the authorization request and sends the authorization response, and the method of FIG.

8 could be implemented by the node which sends the authorization request and receives the authorization response.

As can be seen, the concepts as explained above allow for efficiently handling an authorization request for a service. In particular, changes of the authorization status of the service may be taken into account in order to avoid excessive control session signaling and/or to flexibly control operation of a node sending the authorization request.

It is to be understood that the examples and embodiments as explained above are merely illustrative and susceptible to various modifications. For example, the concepts could be used in other types of mobile networks, e.g., using other types of policy controller than the above-mentioned PCRF. Also, it is to be understood that the illustrated and described nodes, e.g., AF 50, TDF 36' or PCRF 30, may each be implemented by a single device or by multiple devices, e.g., a cloud of interconnected devices or a server farm. Further, it is to be understood that the above concepts may be implemented by using correspondingly designed software in existing network devices, or by using dedicated network device hardware.

The invention claimed is:

1. A method of handling an authorization request, the method comprising:
    a policy controller receiving an authorization request transmitted by an application function (AF) network node in response to signaling received from an end user device for initiating a service provided by the AF network node; and
    in response to receiving the authorization request transmitted by said AF network node in response to the signaling received from the end user device for initiating a service provided by the AF network node, the policy controller:
    performing a first authorization check to determine a first authorization status of the service;
    sending an authorization response to the AF network node, said authorization response indicating the first authorization status of the service;
    performing a second authorization check to determine a second authorization status of the service;
    determining whether the second authorization status is different than the first authorization status; and
    sending to the AF network node a message indicating that the authorization status of the service has changed in response to determining that the second authorization status is different than the first authorization status, wherein
    performing the first authorization check comprises the policy controller obtaining from a subscriber database, at a first point in time, first subscription data associated with the end user device and using the obtained first subscription data to determine the first authorization status; and
    performing the second authorization check comprises the policy controller receiving from a subscriber database, at a later point in time, second subscription data associated with the end user device and using the obtained second subscription data to determine the second authorization status.

2. The method according to claim 1, wherein the authorization response indicates that the service is temporarily not authorized.

3. The method according to claim 1, wherein the authorization response indicates a component of the service which is not authorized.

4. The method according to claim 1, further comprising: the policy controller controlling resources for conveying data packets of the service.

5. The method according to claim 1, wherein the authorization request comprises an indication that the AF network node is to be informed if the authorization status of the session changes.

6. A authorization method, the authorization method comprising:
    an application function (AF) network node receiving a message related to a service provided by the AF network node, wherein the message was transmitted by an end user device;
    the AF network node, in response to receiving the message transmitted by the end user device, sending an authorization request to a policy controller of a mobile network;
    the AF network node receiving a first authorization message from the policy controller, said first authorization message indicating an authorization status of the service as determined by the policy controller;
    the AF network node controlling its operation in relation to the service depending on the authorization status indicated by the first authorization message;
    the AF network node receiving a second authorization message from the policy controller, said second authorization message indicating that the authorization status of the service has changed;
    the AF network node changing its operation in relation to the service based on the second authorization message indicating that the authorization status of the service has changed; and
    if the first authorization message indicates that the service is temporarily not authorized, the AF network node stopping at least one activity with respect to components of the service which are not authorized until receiving the second authorization message indicating that the authorization status of the service has changed.

7. The method according to claim 6, wherein the first authorization message indicates that the service is temporarily not authorized.

8. The method according to claim 6, wherein the first authorization message indicates a component of the service which is not authorized.

9. The method according to claim 8, further comprising: after receiving the first authorization message, the AF network node continuing at least one activity with respect to an authorized component of the service.

10. The method according to claim 6, further comprising: if the first authorization message indicates that the service is temporarily not authorized, the AF network node sending no further authorization requests for the service until receiving the second authorization message indicating that the authorization status of the service has changed.

11. The method according to claim 6, further comprising: if the first authorization message indicates that the session is authorized, the AF network node stopping at least one activity with respect to the service in response to receiving the second authorization message indicating that the authorization status of the session has changed.

12. The method according to claim 6, wherein the authorization request comprises an indication that the AF network node is to be informed if the authorization status of the service changes.

13. A policy controller for controlling resources in a mobile network, comprising:
    an interface for communication with an application function (AF) network node; and
    a processor,
    wherein the processor is configured to:
    receive via the interface an authorization request for a packet-based service in the mobile network, wherein the authorization request is transmitted by the AF network node in response to signaling received from an end user device; and
    in response to receiving the authorization request transmitted by the AF network node in response to signaling received from an end user device:

perform, at a first point in time, a first authorization check to determine a first authorization status of the service;

send via the interface an authorization response to the AF network node, said authorization response indicating the first authorization status of the service;

perform, at a later point in time, a second authorization check to determine a second authorization status of the service; and if the second authorization status is different than the first authorization status, send via the interface a message to the AF network node, said message indicating that the authorization status of the service has changed, wherein the policy controller is configured to perform the first authorization check by obtaining from a subscriber database, at a first point in time, first subscription data associated with the end user device and using the obtained first subscription data to determine the first authorization status; and the policy controller is configured to perform the second authorization check by obtaining from a subscriber database, at a later point in time, second subscription data associated with the end user device and using the obtained second subscription data to determine the second authorization status.

14. The policy controller according to claim 13, further comprising:

a further interface for communicating with a subscriber database of the mobile network, wherein the processor is configured to receive subscription data via the further interface from the subscriber database and to perform the first authorization check and/or the second authorization check on the basis of the received subscription data.

15. The policy controller according to claim 13, further comprising: a control interface for controlling resources for conveying data packets of the service.

16. An application function (AF) network node, comprising:

a receiver;

a transmitter; and one or more processor coupled to the receiver and the transmitter, wherein the AF network node is configured to:

employ the transmitter to send an authorization request to a policy controller of a mobile network in response to receiving a message for initiating a service that was transmitted by an end user device;

control its operation in relation to the service depending on an authorization status of the service indicated by a first authorization message received from the policy controller; and change its operation in relation to the service based on a second authorization message received from the policy controller and indicating that the authorization status of the service has changed, wherein the AF network node is further configured such that, if the first authorization message indicates that the service is temporarily not authorized, the AF network node stops at least one activity with respect to components of the service which are not authorized until receiving the second authorization message indicating that the authorization status of the service has changed.

* * * * *